US011247120B2

(12) United States Patent
Hadfield et al.

(10) Patent No.: US 11,247,120 B2
(45) Date of Patent: Feb. 15, 2022

(54) DIGITAL PIN BOARD FOR A GAMING PLATFORM

(71) Applicant: Sony Interactive Entertainment LLC, San Mateo, CA (US)

(72) Inventors: Taryn Hadfield, San Mateo, CA (US); Michele Ewing, Burlingame, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 456 days.

(21) Appl. No.: 15/730,603

(22) Filed: Oct. 11, 2017

(65) Prior Publication Data
US 2019/0105557 A1 Apr. 11, 2019

(51) Int. Cl.
*A63F 13/79* (2014.01)
*A63F 9/24* (2006.01)
*H04L 29/06* (2006.01)
*A63F 13/352* (2014.01)
*A63F 13/87* (2014.01)

(52) U.S. Cl.
CPC .............. *A63F 9/24* (2013.01); *A63F 13/352* (2014.09); *A63F 13/79* (2014.09); *A63F 13/87* (2014.09); *H04L 29/06034* (2013.01); *H04L 67/38* (2013.01)

(58) Field of Classification Search
CPC .......... A63F 9/24; A63F 13/352; A63F 13/79; A63F 13/87; H04L 29/06034; H04L 67/38
See application file for complete search history.

(56) References Cited

U.S. PATENT DOCUMENTS

| | | | |
|---|---|---|---|
| 9,418,050 B1* | 8/2016 | Brewster | G06F 40/14 |
| 9,436,754 B1* | 9/2016 | Hu | G06F 16/285 |
| 10,263,877 B1* | 4/2019 | Ie | G06F 16/906 |
| 10,467,237 B1* | 11/2019 | Silbermann | G06F 16/248 |
| 10,684,738 B1* | 6/2020 | Sicora | G06F 16/435 |
| 2011/0086702 A1* | 4/2011 | Borst | A63F 13/533 463/30 |
| 2013/0332856 A1* | 12/2013 | Sanders | G06F 3/0481 715/753 |
| 2014/0115497 A1* | 4/2014 | Dhaliwal | G06F 3/048 715/753 |
| 2014/0229479 A1* | 8/2014 | Sharafi | G06Q 10/107 707/736 |

* cited by examiner

*Primary Examiner* — Andrew T Chiusano
(74) *Attorney, Agent, or Firm* — Carr & Ferrell LLP (57) ABSTRACT

The disclosure provides methods and systems for storing and sharing information through a digital pin board within a network gaming platform. An example method comprises maintaining at least one personalized digital board associated with the digital pin board of a user. Furthermore, a selection of an informational item is received from the user. The informational item is associated with at least one personalized digital board of the user. The method further includes presenting, to the user, a graphical user interface of the network gaming platform. The graphical user interface includes a graphical representation of the digital pin board, where the digital pin board includes a graphical representation of at least one personalized digital board of the user.

20 Claims, 6 Drawing Sheets

DIGITAL PIN BOARD FOR A GAMING PLATFORM

TECHNICAL FIELD

This disclosure generally relates to data processing, and more particularly, to methods and systems for creating, maintaining, and sharing digital pin boards within a gaming platform.

DESCRIPTION OF RELATED ART

The approaches described in this section could be pursued, but are not necessarily approaches that have previously been conceived or pursued. Therefore, unless otherwise indicated, it should not be assumed that any of the approaches described in this section qualify as prior art merely by virtue of their inclusion in this section.

Conventionally, users of computers and gaming devices can access a variety of digital content, such as computer games or movies, through a digital content distribution, entertainment, and a gaming platform. One example of such platform is the PlayStation Network® "PSN" which is available to users of PlayStation® devices. For simplicity, the digital content distribution, entertainment, and gaming platform is referred herein to as the "network gaming platform."

Typically, a network gaming platform offers a wide range of features to its users including, for example, video streaming, music streaming, multiplayer gaming, television programming services, cloud gaming services, and online marketplace services. The network gaming platform can also distribute informational content, such as news, advertisements, blog posts, as well as offer social networking services. Users can create corresponding user profiles with the network gaming platform, and communicate with one another or engage in a multiplayer game.

As the network gaming platform distributes a wide range of content, the users may find it important to store and share certain pieces of the content that the users like to access or use in games. Conventional network gaming platforms, however, lack a convenient and efficient way for sharing and accessing content.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Generally, the present disclosure is directed to creating, maintaining, and sharing digital pin boards within a digital content distribution, entertainment, and a gaming platform (e.g., PSN). Some embodiments of the present disclosure may allow users to "pin" or tag informational representations of selected content available via the platform to one or more digital boards. The digital boards can be maintained within a digital pin board of each user. Embodiments of the present disclosure can also enable users to customize the digital boards, share the digital boards with others, subscribe to digital boards of other users or organizations, and monetize distribution of digital boards. In addition, the embodiments of the present disclosure may provide for automated analysis of content pinned to the user pin board to determine user interests. Furthermore, the digital pin boards can be automatically updated with new information relevant to the user interests.

According to one embodiment of the disclosure, provided is a system for storing and sharing information through a digital pin board within a network gaming platform. The system comprises at least one processing unit and a memory. One example of the system can include a server. Collectively, the processing unit and memory can be configured to maintain at least one personalized digital board associated with the digital pin board of a user, receive from the user a selection of an informational item, associate the informational item with the at least one personalized digital board of the user, and present to the user a graphical user interface of the network gaming platform, wherein the graphical user interface includes a graphical representation of the digital pin board, and the digital pin board includes a graphical representation of the at least one personalized digital board of the user.

The system may be further configured to enable the user to create the digital pin board through the graphical user interface of the network gaming platform and enable the user to create the at least one personalized digital board associated with the digital pin board through the graphical user interface of the network gaming platform.

In some embodiments, the informational item includes or is associated with a webpage, a web service, a blog post, a social media user profile, and a social media content all of which are available via the network gaming platform to a plurality of users. In some embodiments, the system is further configured to present an actionable icon for a piece of content available via the network gaming platform, wherein the selection of the informational item is made when the user activates the actionable icon, and wherein the piece of content incorporates the informational item.

The informational item, in some embodiments, is associated with the at least one personalized digital board of the user when a graphical representation of the informational item is created within the at least one personalized digital board. In some additional embodiments, the system is further configured to enable the user to share at least one personalized digital board with other users. In yet other additional embodiments, the system is further configured to analyze the at least one personalized digital board of the user to determine at least one user interest, search for personalized digital board of other users or organizations based on the at least one user interest, and periodically update the graphical representation of the digital pin board presented to the user by including one or more personalized digital boards of the other users or the organizations that contain information relevant to the at least one user interest.

According to another aspect of the present disclosure, provided is a computer-implemented method for storing and sharing information through a digital pin board within a network gaming platform. An example method includes maintaining at least one personalized digital board associated with the digital pin board of a user, receiving, from the user, a selection of an informational item, associating the informational item with the at least one personalized digital board of the user, and presenting, to the user, a graphical user interface of the network gaming platform, wherein the graphical user interface includes a graphical representation of the digital pin board, and the digital pin board includes a graphical representation of the at least one personalized digital board of the user.

In some embodiments, the method further comprises the step of enabling the user to create the digital pin board through the graphical user interface of the network gaming platform. In some embodiments, the method further comprises the step of enabling the user to create the at least one personalized digital board associated with the digital pin board through the graphical user interface of the network gaming platform.

The informational item can include a text and at least one of the following: an image, a video, and a multimedia content, wherein the informational item is displayable through the graphical user interface of the network gaming platform. The informational item can also include or is associated with a computer game, a gameplay, a movie, or a media content, all of which are available via the network gaming platform to a plurality of users. The informational item can include or be associated with a webpage, a web service, a blog post, a social media user profile, and a social media content all of which are available via the network gaming platform to a plurality of users.

In some embodiments, the method further comprises presenting an actionable icon for a piece of content available via the network gaming platform, wherein the selection of the informational item can be made when the user activates the actionable icon, and wherein the piece of content incorporates the informational item.

In some embodiments, the step of associating of the informational item with the at least one personalized digital board of the user includes creating a graphical representation of the informational item within the at least one personalized digital board. Moreover, the digital pin board can further include a graphical representation of at least one personalized digital board of another user or an organization.

The method may further comprise the step of enabling the user to share at least one personalized digital board with other users. In some embodiments, the method further comprises analyzing the at least one personalized digital board of the user to determine at least one user interest, searching for personalized digital board of other users or organizations based on the at least one user interest, and periodically updating the graphical representation of the digital pin board presented to the user by including one or more personalized digital boards of the other users or the organizations that contain information relevant to the at least one user interest.

In some embodiments, the method further comprises analyzing the digital pin board of the user to determine at least one user interest, searching for digital pin boards of other users or organizations based on the at least one user interest, and periodically updating the graphical representation of the digital pin board presented to the user by including one or more digital pin boards of other users or the organizations that contain information relevant to the at least one user interest.

In further embodiments, the method steps are stored on machine-readable medium comprising instructions, which when implemented by one or more processors perform the steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation in the figures of the accompanying drawings, in which like references indicate similar elements.

DETAILED DESCRIPTION

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents.

The techniques of the embodiments disclosed herein can be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein are implemented by a series of computer-executable instructions residing on a storage medium such as a disk drive, or computer-readable medium. It should be noted that methods disclosed herein can be implemented by a cellular phone, smart phone, computer (e.g., a desktop computer, tablet computer, laptop computer), game console, handheld gaming device, and so forth.

The present technology is directed to a digital content distribution, entertainment, and gaming platform, such as PlayStation Network®, which is also referred herein to as the "network gaming platform" for simplicity. The network gaming platform enables each user to create a user profile to provide personalized content distribution, multiplayer gaming, and social networking. The network gaming platform includes a personalized graphical user interface (GUI), where users can enjoy a wide range of services, including, but not limited to, a video streaming, music streaming, multiplayer gaming, television programming services, cloud gaming services, online marketplace services, social networking, and so forth.

According to various embodiments of this disclosure, the GUI of the network gaming platform includes a "digital pin board," which is a part of the GUI where users can receive, store, and share informational items representing a wide range of digital content available via the network gaming platform such as games, movies, audio, TV content, news, web content, social networking content, and the like. Each user has its own unique digital pin board, which can be personalized based on the user preferences and interests. In addition, the digital pin board may contain one or more personalized digital boards. Each personalized digital board represents a collection of informational items previously stored by the user.

When a user views or engages content via the network gaming platform, the user can store information concerning the content of his interest to one of user personalized digital boards of the digital pin board, according to various embodiments. Informational items representing the content can include text and an image, video, audio, or other multimedia content. Thus, when the user clicks or activates the actionable icon, such as a soft button, associated with some content, such as a computer game, the user effectively "pins" at least a small representation of this content to the digital pin board. In other words, when the user wants to store certain informational items representing the content, the user needs to pin or tag, i.e., to activate a certain actionable icon provided with most or all of digital content items within the network gaming platform. For example, a user can tag or pin items across a network of network gaming platform, including, but not limited to, a screenshot, a gameplay, online store content, friend exchanges, and the like. When the items are tagged, the user can organize them in different personalized digital boards. Various embodiments provided below demonstrate some examples of GUIs involving actionable icons for storing information to the digital pin board.

Because users may have different interests, each user can create a personalized digital board associated with a certain type of content, genre, or theme. For example, the user can have the personalized digital boards dedicated to themed areas (e.g., an "Overwatch" theme or "WWII genre" theme) that other users can explore.

In addition, a plurality of personalized digital boards can be created by the user. For example, there can be a first digital board related to shooter games, a second digital board related to strategy games, a third digital board related to vehicle simulation games, a forth board related to action movies, a fifth digital board related to social networking, and so forth. Each user can control a design and visual characteristics of both the digital boards and the digital pin boards.

Note, in some example embodiments, the network gaming platform can analyze the content stored to each individual digital board or the entire digital pin board of the user to determine user preferences and interests. Based on the determined preferences or interests, the network gaming platform can retrieve, access, or aggregate content or certain informational items that may be of interest to the user. The determination can be made by a machine-learning algorithm or a neural network. After the informational items or content is obtained by the network gaming platform, the individual digital boards or digital pin board can be automatically updated and presented to user. For example, if the user has a digital board associated with certain vehicle simulation games, the network gaming platform can automatically determine this user interest, research for information related to new releases of similar vehicle simulation games, news, blog posts, video blogs, social media, and the like, all related to that interest, and intelligently incorporate this information into the user digital board.

Yet another important feature of the instant technology is the ability to share digital pin boards or personalized digital boards between users. Moreover, users can research and review digital pin boards or personalized digital boards of others. The users can also subscribe to the digital pin boards or personalized digital boards of other users in order to follow any changes. In addition, the network gaming platform can offer their user a subscription, or at least to review digital pin boards or personalized digital boards of others based on user preferences and interests. Thus, publishers and influencers can have their own digital pin boards or personalized digital boards, which they can share with the general public, i.e., other users of the network gaming platform. When the digital pin boards or personalized digital boards include advertisement or promotional content, monetization of the content becomes an option, according to some embodiments.

The digital pin boards and personalized digital boards can be created and maintained not only by users, but also by businesses or organizations (including for-profit organizations and non-profit organizations). An organization, such as a software development company, or an individual, such as a professional gamer, can maintain and update certain digital boards open to public view and subscription by others. This approach can create a new and effective way of storing and sharing informational items within a certain subject with others.

The following detailed description of embodiments includes references to the accompanying drawings, which form a part of the detailed description. Note, the features, structures, or characteristics of embodiments described herein may be combined in any suitable manner in one or more implementations. In the instant description, numerous specific details are provided, such as examples of programming, software modules, user selections, network transactions, hardware modules, hardware circuits, hardware chips, and so forth, to provide a thorough understanding of embodiments. One skilled in the relevant art will recognize, however, that the embodiments can be practiced without one or more of the specific details, or with other methods, components, materials, and so forth. In other instances, well-known structures, materials, or operations are not shown or described in detail to avoid obscuring aspects of the disclosure.

Embodiments of this disclosure will now be presented with reference to accompanying drawings which show blocks, components, circuits, steps, operations, processes, algorithms, and the like, collectively referred to as "elements" for simplicity. These elements may be implemented using electronic hardware, computer software, or any combination thereof. Whether such elements are implemented as hardware or software depends upon the particular application and design constraints imposed on the overall system. By way of example, an element, or any portion of an element, or any combination of elements may be implemented with a "processing system" that includes one or more processors. Examples of processors include microprocessors, microcontrollers, Central Processing Units (CPUs), digital signal processors (DSPs), field programmable gate arrays (FPGAs), programmable logic devices (PLDs), state machines, gated logic, discrete hardware circuits, and other suitable hardware configured to perform various functions described throughout this disclosure. One or more processors in the processing system may execute software, firmware, or middleware (collectively referred to as "software"). The term "software" shall be construed broadly to mean processor-executable instructions, instruction sets, code segments, program code, programs, subprograms, software components, applications, software applications, software packages, routines, subroutines, objects, executables, threads of execution, procedures, functions, and the like, whether referred to as software, firmware, middleware, microcode, hardware description language, or otherwise.

Accordingly, in one or more embodiments, the functions described herein may be implemented in hardware, software, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), compact disk ROM (CD-ROM) or other optical disk storage, magnetic disk storage, solid state memory, or any other data storage devices, combinations of the aforementioned types of computer-readable media, or any other medium that can be used to store computer executable code in the form of instructions or data structures that can be accessed by a computer.

For purposes of this patent document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to." The term "or" is used to refer to a nonexclusive "or," such that "A or B" includes "A but not B," "B but not A," and "A and B," unless otherwise indicated.

The terms "game," "gaming application," and "computer game" can be defined to include a computerized game, a video game, a computer game, a network game, an online game, a multiplayer game, a virtual reality game, a game for mobile device, and the like. The terms "user," "gamer," and "player" can be used interchangeably and include a person playing or using a gaming application, and also uses or participates in providing audio playback as described herein.

The term "pin board" can be defined to include a part of a graphical user interface where informational pieces or items can be placed, stored, saved, or otherwise associated such that one or more users can view the informational pieces or items within the graphical user interface. The pin board, in this disclosure, can include one or more personalized digital boards. In one embodiment, a pin board is the same as a digital board. In other embodiments, a pin board includes a plurality of digital boards created by the user and, optionally, other users.

Referring now to the drawings, example embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
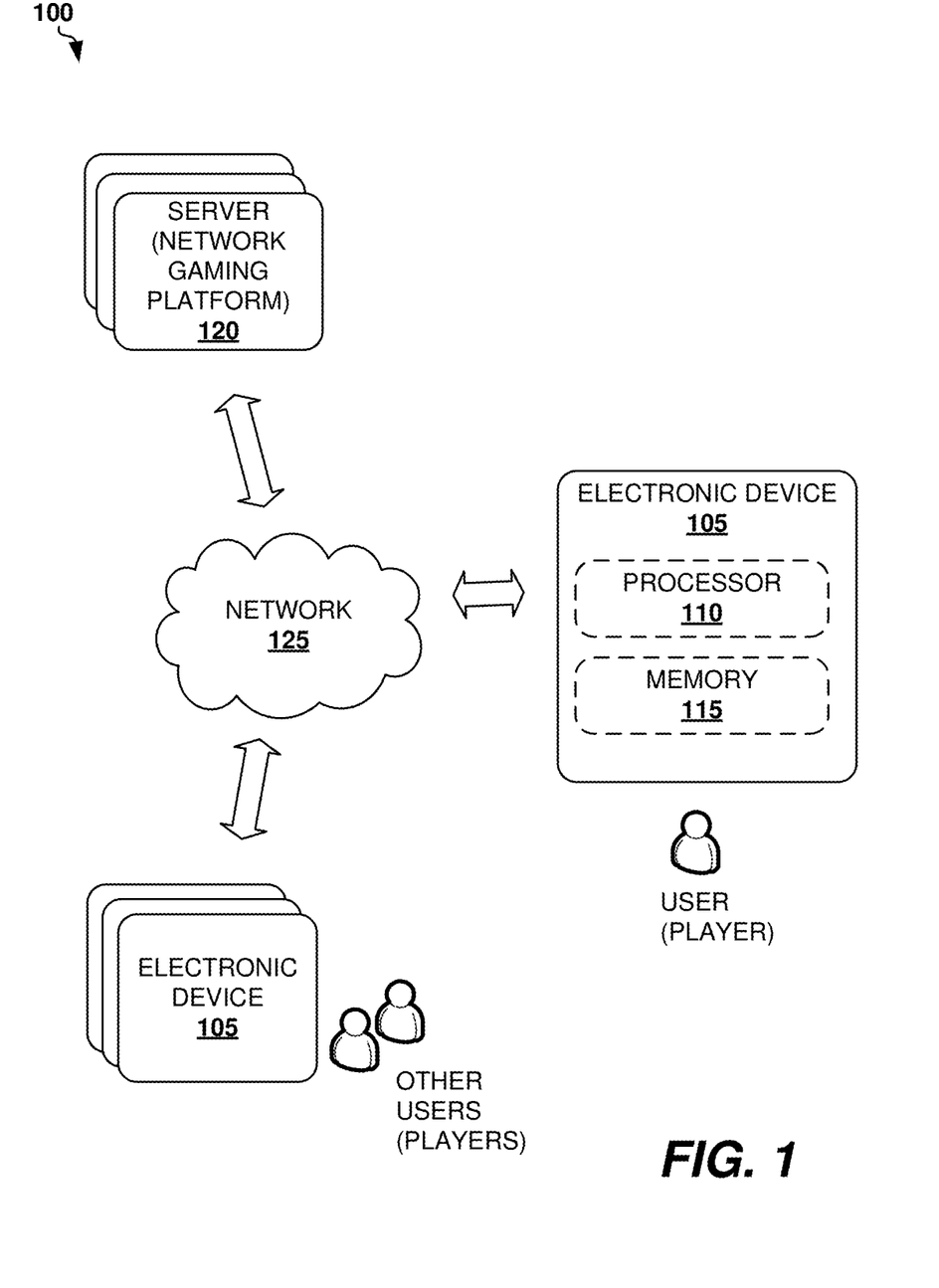
FIG. 1 shows an example system architecture of a network gaming environment, according to one example embodiment.

FIG. 1 shows an example system architecture 100 of a network gaming environment, according to one example embodiment. System architecture 100 can include an electronic device 105 such as a game console, gaming device, computing device, mobile device, cellular phone, smart phone, tablet computer, desktop computer, laptop computer, workstation, multimedia device, television device, smart television device, and the like. As such, electronic device 105 may include input and output devices to enable users to play or use gaming applications (i.e., computer games).

Electronic device 105 may include a processor 110 and a memory 115. Memory 115 can store processor-executable instructions for execution by processor 110. Memory 115 can also store one or more gaming applications, one or more pin boards, one or more personalized digital boards, one or more user settings or preferences, and so forth. The processor-executable instructions can cause processor 110 to implement at least some operations of the methods for storing and sharing information through a digital pin board within a network gaming platform as disclosed herein. Electronic device 105 may further include a user interface, such as a graphical user interface, enabling the user to interact with a gaming application, practice or participate in the method for storing and sharing information through a digital pin board within a network gaming platform, adjust settings associated with the pin boards, to name a few.

In some embodiments, the gaming application can be an online game, network game, or multiplayer game. Accordingly, electronic device 105 of the user can be operatively connected to one or more servers 120 or electronic devices 105 of other users via a network 125. The network 125 is referred to herein as communication network 125 which can refer to any wired, wireless, or optical networks including, for example, the Internet, intranet, local area network (LAN), Personal Area Network (PAN), Wide Area Network (WAN), Virtual Private Network (VPN), cellular phone networks (e.g., packet switching communications network, circuit switching communications network), Bluetooth radio, Ethernet network, an IEEE 802.11-based radio frequency network, IP communications network, or any other data communication network utilizing physical layers, link layer capability, or network layer to carry data packets, or any combinations of the above-listed data networks.

In some implementations, at least one server 120 can include or represent or be a part of the network gaming platform. Also, server 120 can implement some or all operations of the method for storing and sharing information through a digital pin board within a network gaming platform as described herein. For example, electronic device 105 can allow a user to play a gaming application and access content of the various content. In other implementations, all operations of the method described herein can be implemented by electronic device 105.

Figure 2:
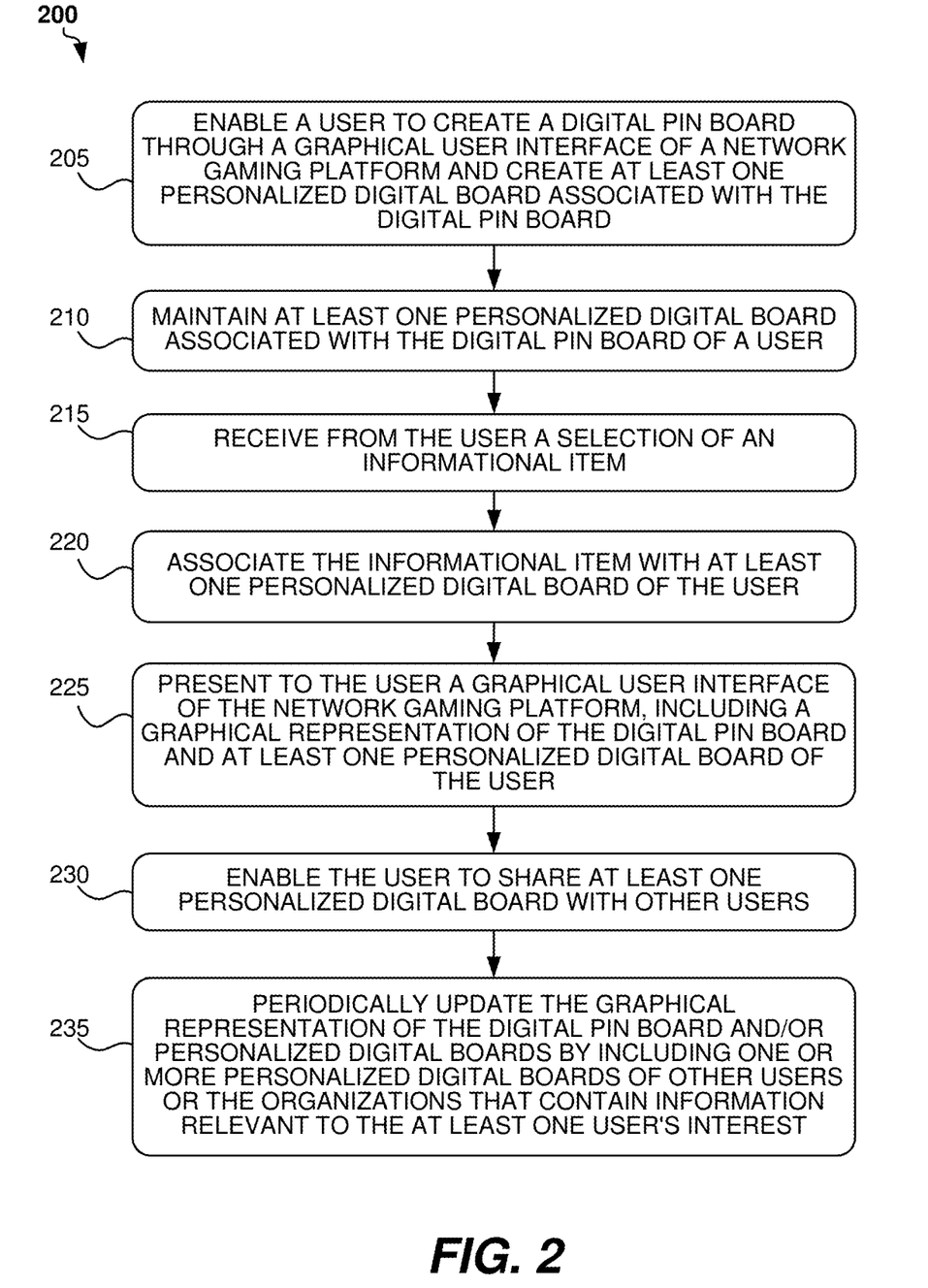
FIG. 2 is a process flow diagram showing a method for storing and sharing information through a digital pin board within a network gaming platform, according to an example embodiment.

FIG. 2 is a process flow diagram showing a method 200 for storing and sharing information through a digital pin board within a network gaming platform, according to an example embodiment. Method 200 can be performed by processing logic that includes hardware (e.g., decision-making logic, dedicated logic, programmable logic, application-specific integrated circuit), software (such as software run on a general-purpose computer system or a dedicated machine), or a combination of both. In one example embodiment, the processing logic refers to one or more elements of electronic device 105 or server 120 of FIG. 1. Operations of method 200 recited below can be implemented in an order different than described and shown in the figure. Moreover, method 200 may have additional operations not shown herein, but which can be evident to those skilled in the art from the disclosure. Method 200 may also have fewer operations than shown in FIG. 2 and described below.

At block 205, a network gaming platform, which can be implemented by one or more servers 120, for example, PlayStation Network® or PSN, is provided to enable a user to create a digital pin board through a GUI of the network gaming platform and create at least one personalized digital board associated with the digital pin board through the same GUI of the network gaming platform. Both the digital pin board and the personalized digital board can be associated with a user profile. Each personalized digital board can be themed. The user can have an option to customize visual parameters of both the digital pin board and the personalized digital board.

In block 210, the method 200 may include maintaining at least one of personalized digital board associated with the digital pin board of the user. This maintaining may be via the user profile such that the user can access them, modify them, and control them. The user can also edit content of the digital pin board and the personalized digital board. For example, the user can add new content, modify existing content, delete the existing content, and so forth. Further steps illustrate how the user can add new content to the digital pin board and the personalized digital board.

Figure 5:
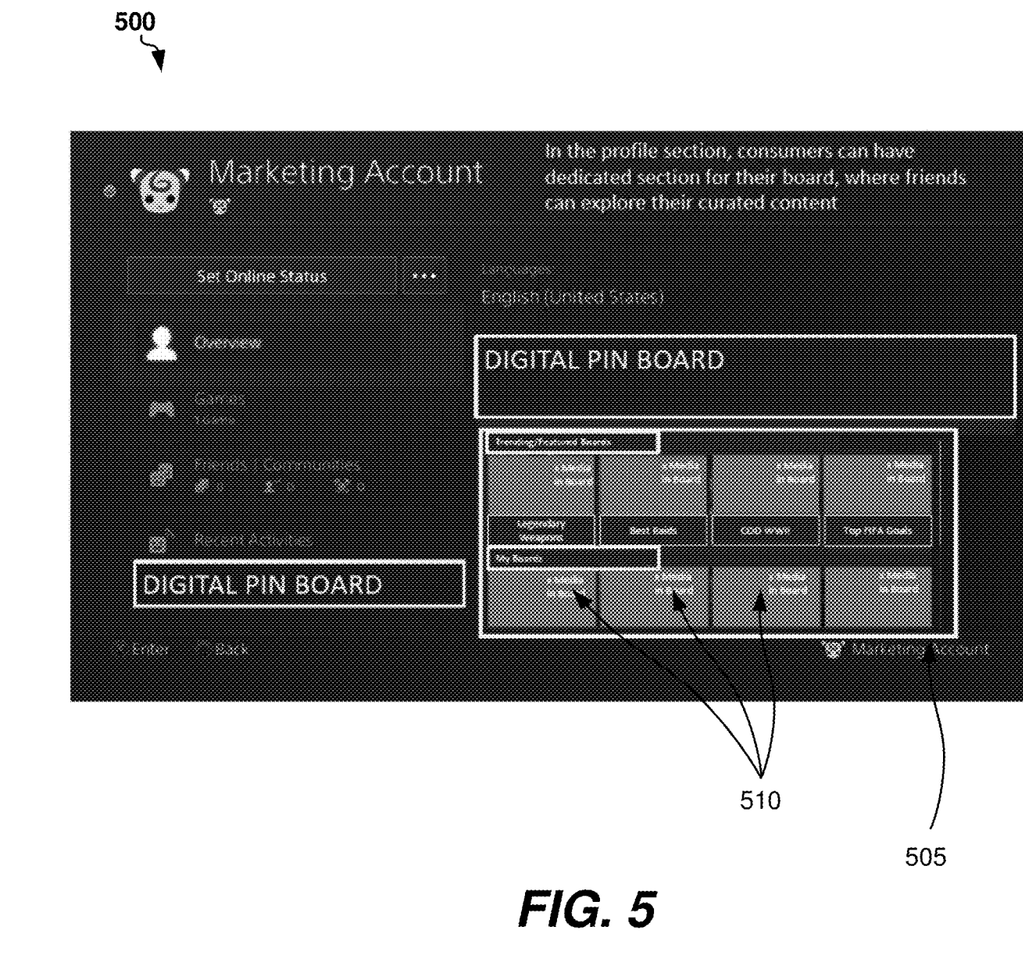
FIG. 5 shows another graphical user interface of electronic device where a user account and a user digital pin board are displayed, according to an example embodiment.

In block 215, the method 200 may include receiving from the user a selection of an informational item from the network gaming platform or a general-content network. The informational item can include a text and at least one of the following: an image, a video, and a multimedia content, wherein the informational item is displayable through the graphical user interface of the network gaming platform. One example of informational item is shown in FIG. 5. In other embodiments, the informational item can include or is associated with a computer game, a gameplay, a movie, or a media content, all of which are available via the network gaming platform to a plurality of users. The informational item can also include or be associated with a webpage, a web service, a blog post, a social media user profile, and a social media content all of which are available via the network gaming platform to the plurality of users.

Figure 3:
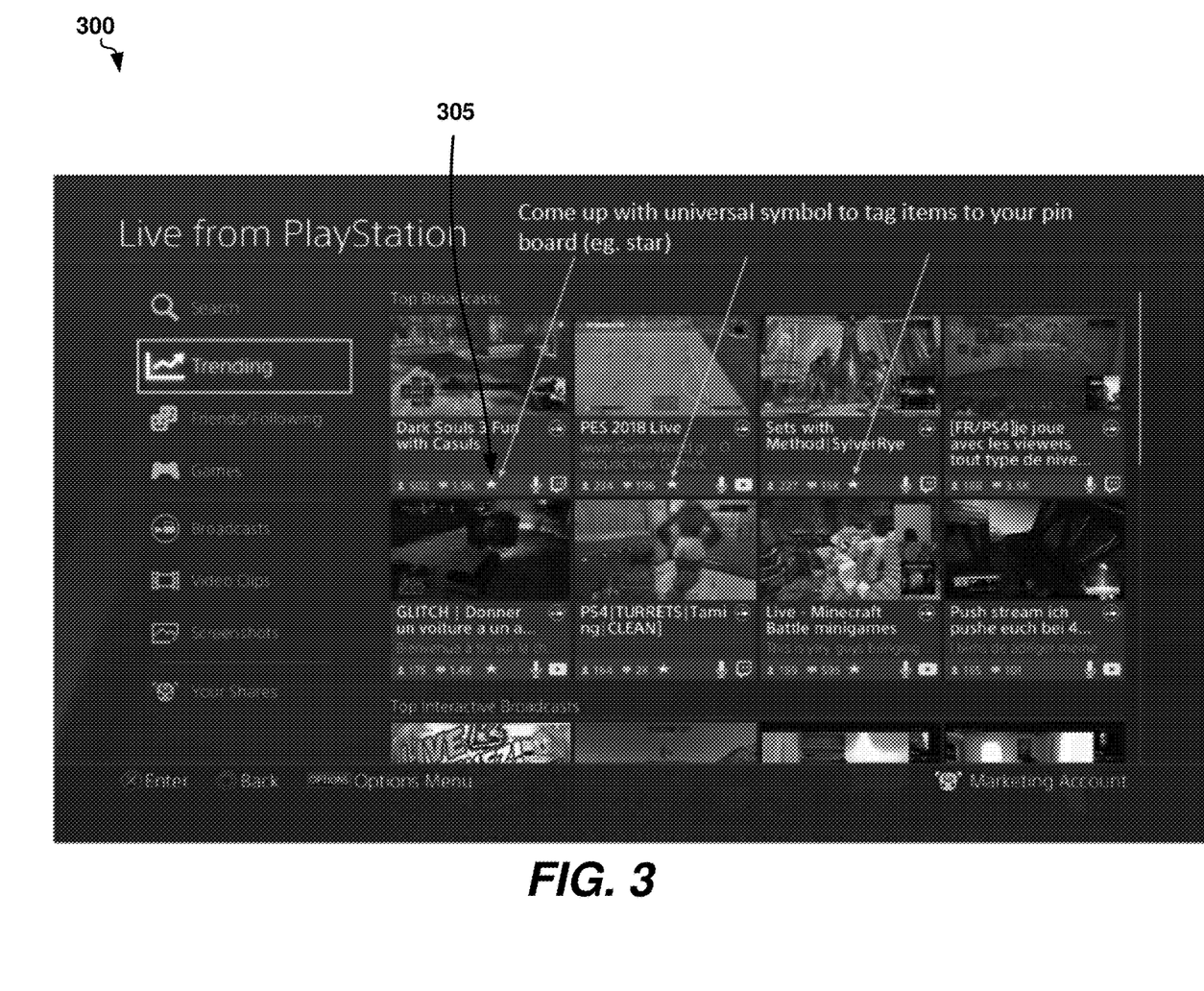
FIG. 3 shows a graphical user interface of electronic device where one or more content items are displayed, according to an example embodiment.
Figure 4:
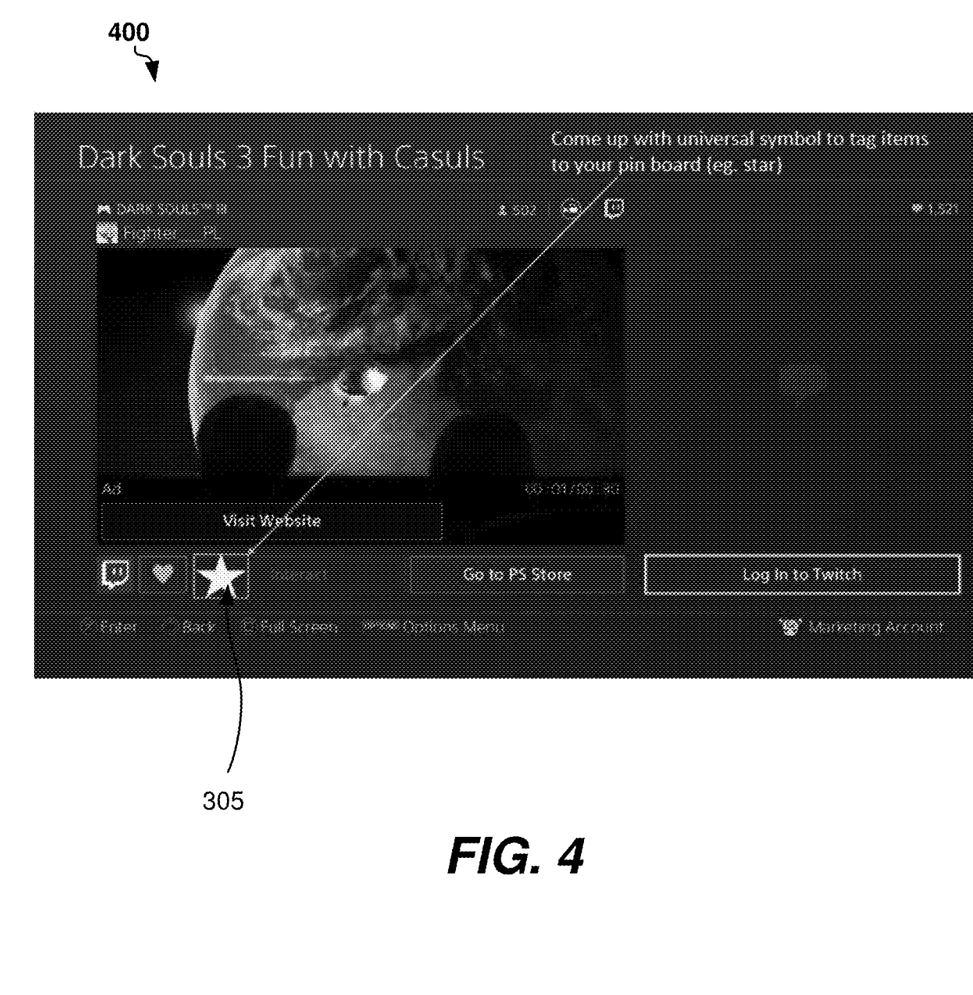
FIG. 4 shows another graphical user interface of electronic device where one content item is displayed, according to an example embodiment.

The selection can be made by the user when the user clicks or activates a soft button, such as a soft button 305 (i.e., actionable icon), shown in FIGS. 3 and 4, associated with certain content material. The selection process can be also referred to as "pinning," "tagging," or "dragging."

In addition, it is important to note that method 200, when associating the informational item with at least one personalized digital board of the user, method 200 creates a graphical representation of the informational item within the personalized digital board. In other words, if the user selects (pins, tags) a new movie available via the network gaming platform for buying and streaming, method 200 creates an informational representation of the movie, which does not include the entire movie, but rather an image (e.g., a screenshot) and associated text.

In block 220, the method 200 may include associating the informational item with at least one personalized digital board of the user. This association means that the informational item can now be displayed as part of the personalized digital board of the user.

In block 225, the method 200 may include presenting to the user a graphical user interface of the network gaming platform, where the graphical user interface includes a graphical representation of the digital pin board having a graphical representation of the at least one personalized digital board of the user. An example of graphical representation of the digital pin board having at least one personalized digital board is shown in FIG. 5.

In some embodiments, the user can view digital pin boards and/or personalized digital boards of other users (including influencers, businesses, publishers, and organizations). Thus, method 200 can also enable the digital pin board to include a graphical representation of at least one personalized digital board of another user or an organization. Similarly, in block 230, the method 200 may include enabling the user to share at least one personalized digital board with other users. Sharing of content can be used in monetization of content. Additionally, sharing the content can be based on privacy settings of the user and/or privacy settings of other users. The privacy settings can be provided through the user profile (account).

In block 235, the method 200 may proceed with periodically updating the graphical representation of the digital pin board presented to the user by including one or more personalized digital boards of other users or organizations that contain information relevant to the at least one user's interest. The information relevant to the at least one user's interest can be automatically searched based on the user's interest. The user's interest, in turn, can be identified by the network gaming platform based on user settings or based on the analysis for at least one personalized digital board of the user. Similarly, the network gaming platform can analyze the digital pin board of the user to determine at least one user's interest, searching for digital pin boards (or digital boards) of other users or organizations based on the at least one user interest, and periodically update the graphical representation of the digital pin board presented to the user by including one or more digital pin boards (or digital boards) of said other users or the organizations.

FIG. 3 shows a GUI 300 of electronic device 105 where one or more content items are displayed, according to one example embodiment. In the example shown, the content items include trending news within the network game platform. Examples of content items can include news, posts, games, gameplays, videos, audios, TV programming, and so forth. Each content item can include a soft button 305 (i.e., actionable icon), which when clicked by the user, initiates causing the network game platform to associate the respective content item with the user digital pin board.

FIG. 4 shows another GUI 400 of electronic device 105 where one content item is displayed, according to one example embodiment. In the example shown, the content item includes a computer game "Dark Souls 3." The content item includes similar soft button 305 (i.e., actionable icon), which when clicked by the user, causes the network game platform to associate the respective content item with the user digital pin board.

FIG. 5 shows another GUI 500 of electronic device 105 where a user account and a user digital pin board are present, according to one example embodiment. In FIG. 5, GUI 500 shows user settings and user data. GUI 500 also includes a graphical representation 505 of user digital pin board. As shown in the figure, graphical representation 505 of user digital pin board includes a plurality of personalized digital boards 510 of the same user or other users.

Figure 6:
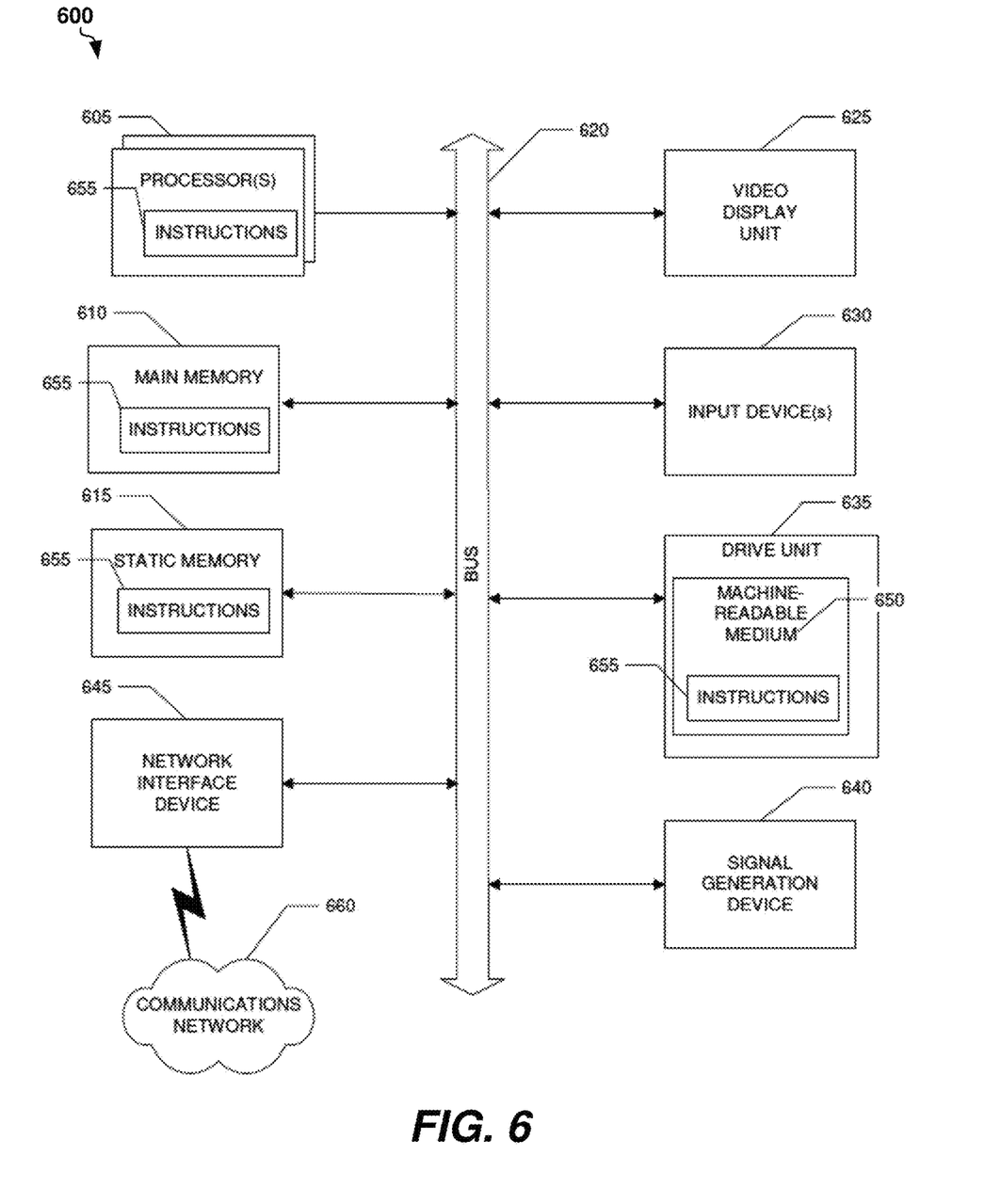
FIG. 6 is a diagrammatic representation of an example machine in the form of a computer system within which a set of instructions for the machine to perform any one or more of the methodologies discussed herein is executed.

FIG. 6 shows a diagrammatic representation of a computing device for a machine in the example electronic form of a computer system 600, within which a set of instructions for causing the machine to perform any one or more of the methodologies discussed herein can be executed. In example embodiments, the machine operates as a standalone device, or can be connected (e.g., networked) to other machines. In a networked deployment, the machine can operate in the capacity of a server, a client machine in a server-client network environment, or as a peer machine in a peer-to-peer (or distributed) network environment. The machine can be a personal computer (PC), tablet PC, game console, gaming device, set-top box (STB), TV device, cellular telephone, portable music player (e.g., a portable hard drive audio device, such as a Moving Picture Experts Group Audio Layer 3 (MP3) player), web appliance, network router, switch, bridge, or any machine capable of executing a set of instructions (sequential or otherwise) that specify actions to be taken by that machine. Further, while only a single machine is illustrated, the term "machine" shall also be taken to include any collection of machines that separately or jointly execute a set (or multiple sets) of instructions to perform any one or more of the methodologies discussed herein.

The example computer system 600 includes a processor or multiple processors 605 (e.g., a central processing unit (CPU), a graphics processing unit (GPU), or both), and a main memory 610 and a static memory 615, which communicate with each other via a bus 620. The computer system 600 can further include a video display unit 625 (e.g., an LCD). The computer system 600 also includes at least one input device 630, such as an alphanumeric input device (e.g., a keyboard), a cursor control device (e.g., a mouse), a microphone, a digital camera, a video camera, and so forth. The computer system 600 also includes a disk drive unit 635, a signal generation device 640 (e.g., a speaker), and a network interface device 645.

The drive unit 635 (also referred to as the disk drive unit 635) includes a machine-readable medium 650 (also referred to as a computer-readable medium 650), which stores one or more sets of instructions and data structures (e.g., instructions 655) embodying or utilized by any one or more of the methodologies or functions described herein. The instructions 655 can also reside, completely or at least partially, within the main memory 610 and/or within the processor(s) 605 during execution thereof by the computer system 600. The main memory 610 and the processor(s) 605 also constitute machine-readable media.

The instructions 655 can further be transmitted or received over a communications network 660 via the network interface device 645 utilizing any one of a number of well-known transfer protocols (e.g., Hyper Text Transfer Protocol (HTTP), CAN, Serial, and Modbus). The communications network 660 includes the Internet, local intranet, Personal Area Network (PAN), Local Area Network (LAN), Wide Area Network (WAN), Metropolitan Area Network (MAN), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, Digital Subscriber Line (DSL) connection, Ethernet connection, Integrated Services Digital Network (ISDN) line, cable modem, Asynchronous Transfer Mode (ATM) connection, a Fiber Distributed Data Interface (FDDI) or Copper Distributed Data Interface (CDDI) connection. Furthermore, communications also includes links to any of a variety of wireless networks including Wireless Application Protocol (WAP), General Packet Radio Service (GPRS), Global System for Mobile Communication (GSM), Code Division Multiple Access (CDMA) or Time Division Multiple Access (TDMA), cellular phone networks, Global Positioning System (GPS), cellular digital packet data (CDPD), Research in Motion, Limited (RIM) duplex paging network, Bluetooth radio, or an IEEE 802.11-based radio frequency network.

While the machine-readable medium 650 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, XML, Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, C#, .NET, Adobe Flash, Perl, UNIX Shell, Visual Basic or Visual Basic Script, Virtual Reality Markup Language (VRML), ColdFusion™ or other compilers, assemblers, interpreters, or other computer languages or platforms.

Thus, the technology for creating and sharing information through a digital pin board within a network gaming platform is disclosed. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A system for storing and sharing information through a digital pin board within a network gaming platform, the system comprising at least one processing unit and a memory, which are collectively configured to:
maintain at least one personalized digital board associated with a digital pin board of a user;
receive, from the user, a selection of an informational item, the informational item being associated with a digital content;
based on the selection, associate the informational item with the at least one personalized digital board of the user;
based on at least a portion of the digital content associated with the informational item, create an informational representation of the informational item;
present, to the user, a graphical user interface of a network gaming platform, the graphical user interface including a graphical representation of the digital pin board, the digital pin board including a graphical representation of the at least one personalized digital board of the user, the informational representation of the informational item being displayed on the at least one personalized digital board; and share the personalized digital board with one or more other users of the network gaming platform, wherein the sharing includes making the digital pin board available for incorporation into the one or more other users' digital pin boards.

2. The system of claim 1, wherein the at least one processing unit and the memory are further configured to:
enable the user to create the digital pin board through the graphical user interface of the network gaming platform; and
enable the user to create the at least one personalized digital board associated with the digital pin board through the graphical user interface of the network gaming platform.

3. The system of claim 1, wherein the informational item includes or is associated with at least one of the following: a webpage, a web service, a blog post, a social media user profile, and a social media content all of which are available via the network gaming platform to a plurality of users.

4. The system of claim 1, wherein the at least one processing unit and the memory are further configured to:
present an actionable icon for a piece of content available via the network gaming platform;
wherein the selection of the informational item is made when the user activates the actionable icon, and wherein the piece of content incorporates the informational item.

5. The system of claim 1, wherein the informational item is associated with the at least one personalized digital board of the user when a graphical representation of the informational item is created within the at least one personalized digital board.

6. The system of claim 1, wherein the at least one processing unit and the memory are further configured to enable the user to share at least one personalized digital board with other users.

7. The system of claim 1, wherein the at least one processing unit and the memory are further configured to:
analyze the at least one personalized digital board of the user to determine at least one user interest;
search for a personalized digital board of further users or organizations based on the at least one user interest; and
periodically update the graphical representation of the digital pin board presented to the user by including one or more personalized digital boards of the further users or organizations that contain information relevant to the at least one user interest.

8. A computer-implemented method for storing and sharing information through a digital pin board within a network gaming platform, the method comprising:
maintaining at least one personalized digital board associated with a digital pin board of a user;
receiving from the user a selection of an informational item, the informational item being associated with a digital content;
based on the selection, associating the informational item with the at least one personalized digital board of the user;
based on at least a portion of the digital content associated with the informational item, creating an informational representation of the informational item;
presenting to the user a graphical user interface of a network gaming platform, the graphical user interface including a graphical representation of the digital pin board, the digital pin board including a graphical representation of the at least one personalized digital board of the user, the informational representation of the informational item being displayed on the at least one personalized digital board; and
sharing the personalized digital board with one or more other users of the network gaming platform, wherein the sharing includes making the digital pin board available for incorporation into the one or more other users' digital pin boards.

9. The method of claim 8, further comprising enabling the user to create the digital pin board through the graphical user interface of the network gaming platform.

10. The method of claim 8, further comprising enabling the user to create the at least one personalized digital board associated with the digital pin board through the graphical user interface of the network gaming platform.

11. The method of claim 8, wherein the informational item includes a text and at least one of the following: an image, a video, and a multimedia content, wherein the informational item is displayable through the graphical user interface of the network gaming platform.

12. The method of claim 8, wherein the informational item includes or is associated with at least one of the following: a computer game, a gameplay, a movie, or a media content, all of which are available via the network gaming platform to a plurality of users.

13. The method of claim 8, wherein the informational item includes or is associated with at least one of the following: a webpage, a web service, a blog post, a social media user profile, and a social media content all of which are available via the network gaming platform to a plurality of users.

14. The method of claim 8, further comprising:
presenting an actionable icon for a piece of content available via the network gaming platform;
wherein the selection of the informational item is made when the user activates the actionable icon, and wherein the piece of content incorporates the informational item.

15. The method of claim 8, wherein the associating of the informational item with the at least one personalized digital board of the user includes creating a graphical representation of the informational item within the at least one personalized digital board.

16. The method of claim 8, wherein the digital pin board further includes a graphical representation of at least one personalized digital board of another user or an organization.

17. The method of claim 8, further comprising enabling the user to share at least one personalized digital board with other users.

18. The method of claim 8, further comprising:
analyzing the at least one personalized digital board of the user to determine at least one user interest;
searching for personalized digital boards of other users or organizations based on the at least one user interest; and
periodically updating the graphical representation of the digital pin board presented to the user by including one or more personalized digital boards of the other users or organizations that contain information relevant to the at least one user interest.

19. The method of claim 8, further comprising:
analyzing the digital pin board of the user to determine at least one user interest;
searching for digital pin boards of other users or organizations based on the at least one user interest; and periodically updating the graphical representation of the digital pin board presented to the user by including one or more digital pin boards of the other users or organizations that contain information relevant to the at least one user interest.

20. A non-transitory processor-readable medium having instructions stored thereon, which when executed by one or more processors, cause the one or more processors to implement a method for storing and sharing information through a digital pin board within a network gaming platform, the method comprising:

maintaining at least one personalized digital board associated with a digital pin board of a user;

receiving, from the user, a selection of an informational item, the informational item being associated with a digital content;

based on the selection, associating the informational item with the at least one personalized digital board of the user;

based on at least a portion of the digital content associated with the informational item, create an informational representation of the informational item;

presenting, to the user, a graphical user interface of a network gaming platform, the graphical user interface including a graphical representation of the digital pin board, the digital pin board including a graphical representation of the at least one personalized digital board of the user, the informational representation of the informational item being displayed on the at least one personalized digital board; and sharing the personalized digital board with one or more other users of the network gaming platform, wherein the sharing includes making the digital pin board available for incorporation into the one or more other users' digital pin boards.

\* \* \* \* \*